United States Patent [19]

Kiuchi et al.

[11] Patent Number: 4,676,624
[45] Date of Patent: Jun. 30, 1987

[54] MULTIPLE EXPOSURE DEVICE FOR CAMERA

[75] Inventors: Masayoshi Kiuchi; Yoshihito Harada; Ryuichi Kobayashi; Masaharu Kawamura, all of Kanagawa, Japan

[73] Assignee: Canon Kabushiki Kaisha

[21] Appl. No.: 792,690

[22] Filed: Oct. 29, 1985

[30] Foreign Application Priority Data

| Oct. 31, 1984 | [JP] | Japan | 59-229771 |
| Oct. 31, 1984 | [JP] | Japan | 59-229772 |
| Oct. 31, 1984 | [JP] | Japan | 59-229773 |
| Dec. 28, 1984 | [JP] | Japan | 59-276961 |
| Dec. 28, 1984 | [JP] | Japan | 59-276963 |

[51] Int. Cl.⁴ .............. G03B 7/08; G03B 17/36; G03B 1/18; G03B 19/02
[52] U.S. Cl. .................. 354/410; 354/412; 354/475; 354/173.1; 354/209
[58] Field of Search .......... 354/410, 412, 465, 471, 354/474, 475, 209, 217, 218, 289.1, 110, 173.1, 173.11

[56] References Cited

U.S. PATENT DOCUMENTS

| 3,842,587 | 10/1974 | Strauss et al. | 354/412 |
| 4,021,828 | 5/1977 | Iura et al. | 354/217 |
| 4,175,840 | 11/1979 | Kittag | 354/209 X |
| 4,191,463 | 3/1980 | Urano et al. | 354/209 X |
| 4,345,830 | 8/1982 | Aratame | 354/173.11 |
| 4,420,237 | 12/1983 | Ogawa et al. | 354/465 X |

FOREIGN PATENT DOCUMENTS 185317 10/1984 Japan ............... 354/209

Primary Examiner—W. B. Perkey
Attorney, Agent, or Firm—Toren, McGeady & Associates

[57] ABSTRACT

A multiple exposure device for a camera is arranged to permit one and the same frame portion of film to be exposed to light a plurality of times. In taking a multi-exposed photograph, the device displays a multi-exposure mode; permits a manual resetting operation on the multi-exposure mode for improved operability of the camera; and computes the degree of exposure to be effected at each step of the multiple exposure to ensure an appositely exposed state of the film frame on which the multiple exposure operation is performed.

10 Claims, 33 Drawing Figures

FIG. 2A

| | 7 | | 0 |
|---|---|---|---|
| RAM1 | AE MODE | | |
| RAM2 | LIGHT MEASURING MODE | | |
| RAM3 | ASA FILM SENSITIVITY | | |
| RAM4 | NUMBER OF FRAMES | | |
| RAM5 | SETTING VALUE OF NUMBER OF MULTIPLE-EXPOSURE STEPS | | |
| RAM6 | SETTING VALUE OF APERTURE | | |
| RAM7 | SHUTTER SPEED SETTING VALUE | | |
| RAM8 | A/D CONVERSION VALUE | | |
| RAM9 | COMPUTED APERTURE VALUE | | |
| RAM10 | COMPUTED SHUTTER SPEED VALUE | | |
| RAM11 | NUMBER OF APERTURE CONTROL STEPS | | |
| RAM12 | REMAINING AMOUNT OF MULTIPLE EXPOSURE | | |
| RAM13 | MULTI-EXPOSURE FLAG | MAGIC FLAG | |

FIG. 2B

| RAM1 | | RAM2 | | RAM3 |
|---|---|---|---|---|
| CONTENT OF RAM | INFORMATION CORRESPONDING TO CONTENT | CONTENT OF RAM | INFORMATION CORRESPONDING TO CONTENT | CONTENT OF RAM | INFORMATION CORRESPONDING TO CONTENT |

| CONTENT OF RAM | INFORMATION CORRESPONDING TO CONTENT |
|---|---|
| 1 | TV PREFERENCE |
| 2 | AV PREFERENCE |
| 3 | WIDE PROGRAM |
| 4 | NORMAL PROGRAM |
| 5 | TELEPHOTO PROGRAM |

| CONTENT OF RAM | INFORMATION CORRESPONDING TO CONTENT |
|---|---|
| 1 | AVERAGING PHOTOMETRY |
| 2 | PARTIAL PHOTOMETRY |
| 3 | SPOT PHOTOMETRY |

| CONTENT OF RAM | INFORMATION CORRESPONDING TO CONTENT |
|---|---|
| 1 | 25 |
| 2 | 50 |
| 3 | 100 |
| 4 | 200 |
| 5 | 400 |
| 6 | 800 |
| 7 | 1600 |
| 8 | 3200 |
| 9 | 6400 |

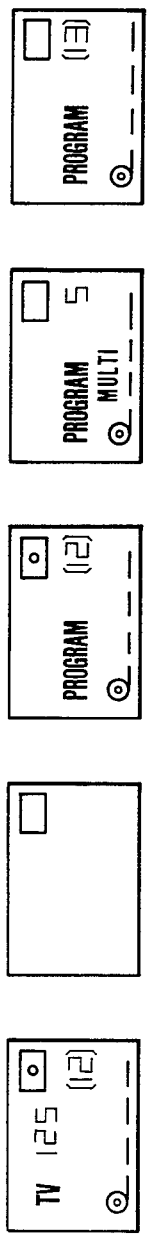
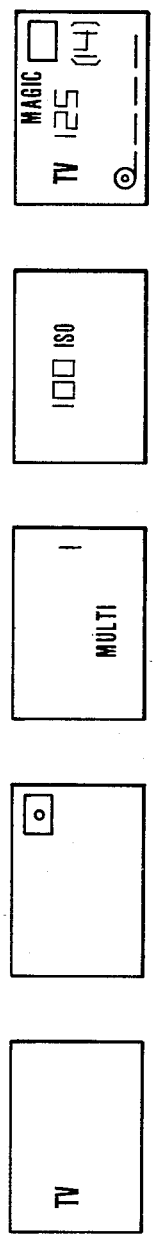
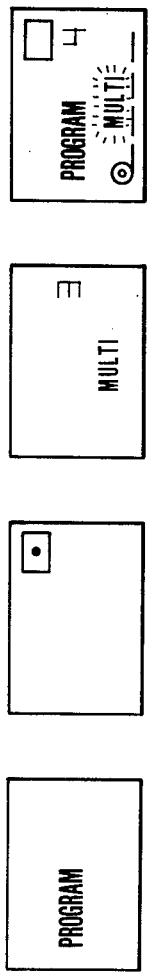
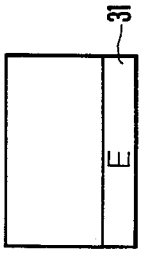

FIG. 5E
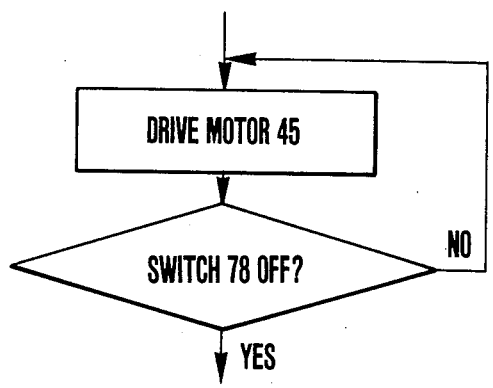
FIG. 5F
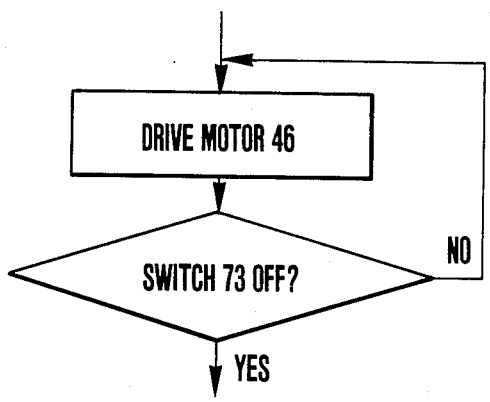
FIG. 5G
| SET CONTENT OF COUNTER 60 WITHIN RAM 5 |
|---|

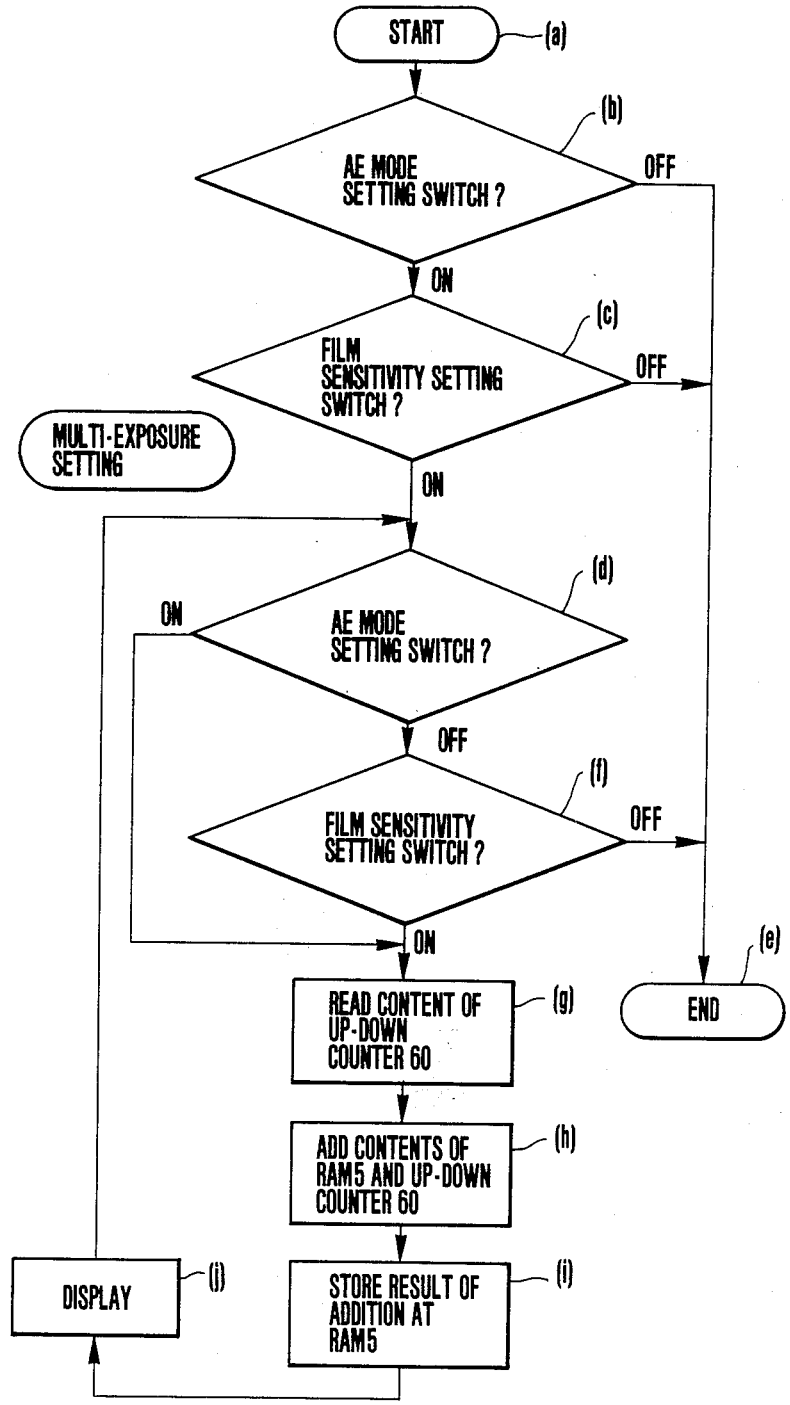

MULTIPLE EXPOSURE DEVICE FOR CAMERA

BACKGROUND OF THE INVENTION

1. Field of the Invention

This invention relates to a multiple exposure device for a camera and more particularly to a multiple exposure device which permits presetting a number of performance steps of a multiple exposure operation.

2. Description of the Prior Art

According to the conventional multiple exposure arrangement for a camera, the camera is set into a multi-exposure mode either by manually operating a multi-exposure operation member or by having it kept in a multi-exposure position by a lock device in response to the manual operation. A motor drive device is switched on to start a photo-taking operation. Then, the number of performances of multiple exposure are counted by the camera operator through the travelling sound of the shutter of the camera. The operator is required to switch off the motor drive device to bring the multiple exposure operation to a stop when the number of performances reach a desired number. However, in cases where the photo-taking is repeated in a quick cycle, it has been almost impossible to accurately count the number of exposure performances. It has been thus difficult for the operator to switch off the motor drive device in concurrence with the end of a desired number of multi-exposure performances.

In view of this shortcoming of the conventional multi-exposure arrangement, a camera arranged to permit presetting a desired number of multi-exposure performances and to perform film winding upon completion of the preset number of multi-exposure performances has been disclosed in Japanese Laid-Open Patent Application No. SHO 56-95231. However, it this camera does not display whether or not the film has already been exposed after presetting of the number of multi-exposure performances. Therefore, there has been the following inconvenience in the event of cancelling a multi-exposure operation during the process thereof after presetting of the number of multi-exposure performance steps. In case that the multi-exposure is cancelled when the film has been actually exposed to light after setting a multiple exposure, the film must be wound up for a next photo-taking operation. However, if the film is wound up while the film has not been actually exposed to light, one frame portion of the film would never be exposed. In that event, the film winding must be prevented. Whereas, the multi-exposure device of the conventional camera has not been arranged to make a display to show the operator whether the film has been exposed or not after presetting of a multi-exposure operation. It has thus been impossible to determine whether or not a film winding process must be performed at the time of cancelling the multi-exposure operation mode.

Further, to have a desired number of performances of multiple exposure accurately carried out, the camera disclosed in the above-cited Japanese Laid-Open Patent Application No. SHO 56-95231 is arranged as follows: A member which is controlling a film feeding operation is kept in a position not to allow film winding concurrently with a charging operation on a shutter when the shutter is charged. A counter is arranged to count the number of times for which a multiple exposure is performed. After commencement of a multi-exposure operation, when the counted values of the counter reaches a number of times which is a desired number of times minus one, the above-stated holding member is released from its holding operation on the film feeding control member by a shutter charging process performed at that time. Then, after completion of the last performance of the multiple exposure, film winding is performed concurrently with shutter charging in such a way as to automatically bring the multi-exposure operation to an end.

The camera disclosed in the above Japanese patent application is thus arranged to have the film feeding control member shifted from a position not allowing film feeding to another position allowing film feeding when the counted values of the counter counting the performances of multiple exposure for ending the process of multiple exposure reaches a value which is a desired number of performances minus one. Therefore, in cases where the multiple exposure mode is to be cancelled during the process of multiple exposure, the position of the film feeding control member cannot be shifted until the counted value of the counter reaches the value which is the desired number of performances minus one. This virtually prohibits the multiple exposure from being cancelled even when it becomes desirable to cancel the multiple exposure during the process thereof.

Further, with the conventional device used in carrying out multiple exposure for a preset number of performances, the camera is allowed to shift to a normal exposure mode after completion of multiple exposure without prohibiting a further process of exposure. Therefore, when film winding is performed after the multiple exposure, a normal photo-taking operation might immediately follow the film winding process to waste the film after the multi-exposure process.

The conventional multiple exposure device is arranged to have a desired amount or degree of exposure for each performance step of the multi-exposure operation preset by the camera operator. It has been, therefore, difficult to have the film appropriately exposed through all the exposures made for a multiple exposure.

SUMMARY OF THE INVENTION

It is a general object of this invention to provide a multiple exposure device for a camera which is capable of eliminating the above-stated shortcomings of the prior art.

It is a more specific object of this invention to provide a multiple exposure device for a camera, wherein the device is capable of making a display as to whether or not even one of the exposing steps of a multiple exposure operation has been performed.

It is another object of this invention to provide a multiple exposure device for a camera, wherein, in carrying out multiple exposure, the device is arranged to permit cancellation of the multi-exposure mode of the camera even before the end of a multi-exposure operation.

It is a further object of this invention to provide a multiple exposure device which is arranged to inhibit an exposure operation after completion of a multiple exposure operation.

It is a still further object of this invention to provide a multiple exposure device which is arranged to compute the degree of exposure to be made at each of the performance steps of a multi-exposure operation and thus to control the multi-exposure operation on one and the same frame portion of film to ensure an adequate overall exposure of the frame.

These and further objects and features of this invention will become apparent from the following detailed description of preferred embodiments thereof taken in connection with the accompanying drawings.

BRIEF DESCRIPTION OF THE DRAWINGS

FIG. 2A is a chart showing data storing assignments allotted to random access memories (RAM's) incorporated in a micro-computer 10 shown in FIG. 1. FIG. 2B shows correlation between the contents of RAM's and photographic information.

FIGS. 4A to 4N show displays made at a display device 21. FIG. 4O shows, by way of example, a display made at a display device 31.

FIGS. 5A to 5G are flow charts showing the operation of the micro-computer 10.

FIG. 10 is a flow chart showing the operation of a micro-computer 10 arranged to control the embodiment shown in FIG. 9.

DETAILED DESCRIPTION OF THE PREFERRED EMBODIMENTS

Figure 1:
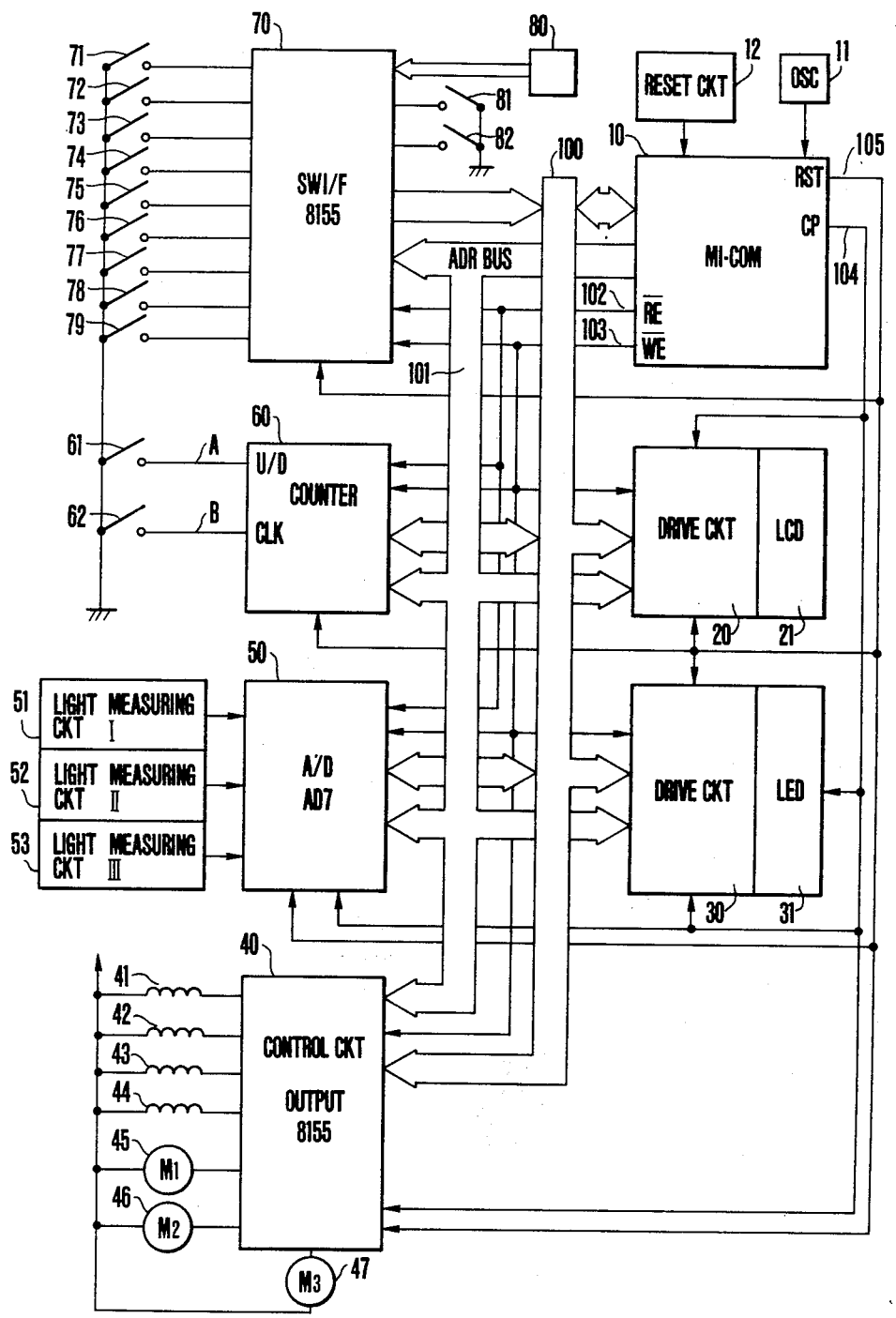
FIG. 1 is a circuit block diagram showing a camera arranged as a first embodiment of this invention.

FIG. 1 is a block diagram showing a camera arranged according to this invention as a first embodiment thereof. The embodiment is provided with a micro-computer 10 (hereinafter referred to as MI-COM) which controls the whole camera and incorporates therein a read-only memory (ROM) storing a camera controlling program therein and random-access memories (RAM's) arranged to store data therein. A clock pulse oscillator 11 is arranged to generate reference clock pulses for the MI-COM 10. A reset circuit 12 is arranged to perform a resetting operation when power supply is switched on. A drive circuit 20 is arranged to cause a liquid crystal display (LCD) to be made on the basis of a data produced via a data bus 100 from the MI-COM 10. An LCD display device 21 is arranged to be driven by the drive circuit 20. A drive circuit 30 is arranged to cause light-emitting-diode (LED) display to be made on the basis of a data produced from the MI-COM 10 via the data but 100. An LED display device 31 is arranged to be driven by the drive circuit 30. A control circuit 40 is arranged to control, on the basis of data supplied from the MI-COM 10 via the data bus 100 to addresses designated by an address bus 101, an automatic exposure (AE) controlling magnet 41, a quick return mirror controlling magnet 42, a leading shutter curtain holding magnet 43, a trailing shutter curtain holding magnet 44, a shutter and AE mechanism charging motor 45, a film winding motor 46 and a film rewinding motor 47. An analog-to-digital (AD) converter 50 is arranged to selectively perform an AD converting operation, on the basis of an address data produced from the MI-COM 10 via the address bus 101, on a light measurement output obtained from a light measuring circuit 51 (for averaging photometry), a light measuring circuit 52 (for partial photometry), or light measuring circuit 53 (for spot photometry). The result of AD conversion thus obtained is supplied to the MI-COM 10 via the data bus 100. Each of these light measuring circuits 51, 52 and 53 includes, for example, a silicon photo cell (SPC), a metal-oxide semiconductor (MOS) amplifier and a logarithmic compression diode.

An up-down counter 60 is arranged for setting photographic information and to increase or decrease the counted value thereof according to signals coming from switches 61 and 62 which are arranged to turn on or off in response to an operation performed on a dial (not shown). The switch 61 is used for setting the counter 60 into an up-count mode or a down-count mode while the switch 62 is connected to the clock input terminal of the counter 60. A switch interface 70 (hereinafter will be called SWI/F) is arranged to have information on the on or off states of switches 71 to 79 and 80 to 82 selectively supplied to the data bus 100 on the basis of the address produced from the MI-COM 10 via the address bus 101. The group of switches 71–82 mentioned above consists of a light measurement switch 71, a release switch 72, a film switch 73, which turns off upon completion of film winding, an AE mode setting switch 74, a light measuring mode setting switch 75, a film sensitivity setting switch 76, a continuous shooting/single shooting change-over switch 77, which turns on for a continuous shooting operation and off for a single shooting operation, a switch 78, which turns on upon completion of a release process and off upon completion of an AE shutter charging process, a multi-exposure mode setting switch 79, a switch 80 arranged to produce a signal indicative of a maximum aperture value F of the lens in use in four bits, a switch 81 arranged to produce a number of pulses corresponding to the driven extent of a diaphragm, and a switch 82 arranged to turn off when the lens is in an AE mode and to turn on when it is in a manual operation mode. A reading signal 102 is produced from the MI-COM 10 when the MI-COM 10 receives the output of another circuit via the data bus 100. A writing signal 103 is produced from the MI-COM 10 when a data is produced from the MI-COM 10 via the data bus 100 to another circuit. A clock signal line 104 connects the MI-COM 10 to other circuit blocks for the purpose of synchronizing the whole circuit arrangement. A reset signal line 105 is arranged to be used for producing a reset signal for resetting the whole circuit arrangement.

Referring to FIG. 2A, the MI-COM 10 includes RAM 1 to RAM 13 which respectively store data relative to the AE mode, the light measuring mode, an ASA film sensitivity value, a number of frames, a setting value of number of multi-exposure steps, a setting value of aperture, a shutter speed setting value, an AD converted value of the brightness of an object to be photographed, a computed aperture value, a computed shutter speed value, a number of aperture control steps, a remaining amount of multiple exposure, a multi-exposure flag and a magic flag. The multi-exposure flag is arranged to become "0" in case where no exposure has been performed after setting the camera into the multi-exposure mode and becomes "1" in case where the exposure has been performed even once under that mode. The magic flag is arranged to indicate whether or not there has been performed a magic photographing operation wherein exposure information on an aperture value or a shutter speed value, etc. is automatically shifted in the event of an excessively bright or excessively dark object.

The first embodiment which is arranged as described above operates in the following manner: Under a normal condition and with power supply effected from a power supply circuit (not shown) to each applicable circuit of the camera, the switch 73 is off representing a film winding completed state of the camera.

With the camera under that condition, the MI-COM 10 is causing the ICD display device 21 to show a number of frames, the photographing mode, etc., as represented in FIG. 4A. The MI-COM 10 is detecting the states of switches 71 to 79 one after another in a repeating cycle via the SWI/F 70. The MI-COM 10 also repetitively detects whether or not the counted value of the counter 60 has changed from zero. This condition of the camera is called a stand-by mode.

Figure 3A:
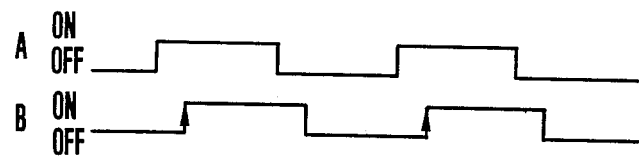
FIGS. 3A and 3B are time charts showing signals produced from switches 61 and 62 when an operation member is moved rightward.
Figure 3B:
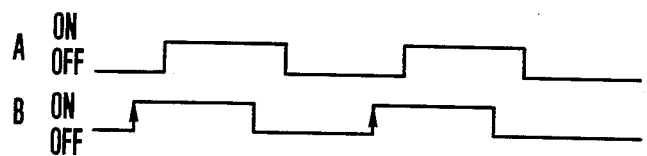

Under the stand-by mode, when the MI-COM 10 detects that the AE mode setting switch 74 is turned on, the embodiment operates as follows: Before the AE mode setting switch 74 is turned on, the RAM 1 stores "1". In other words, in this instance, the camera is in a shutter preference mode as well as in the AE mode as shown in FIG. 2B and the LCD display device 21 shows "TV" indicating the shutter preference mode as represented by FIG. 4A. With the AE mode setting switch 74 turned on, when the MI-COM 10 detects this state of the switch, the MI-COM 10 causes the LCD display device 21 to make a display as shown in FIG. 4B. Following this, when a dial (not shown) is turned, the switches 61 and 62 repetitively turn on and off accordingly, as the dial is turned. The waveforms of signals coming to the terminals A and B of the up-down counter 60, i.e. the U/D input and CLK input signals of the counter 60, then becomes as shown in FIG. 3A with the dial turned to the right, and as shown in FIG. 3B with the dial turned to the left. Then, the counter 60 detects that the level of the CLK input signal changes from a low level to a high level and begins to perform a counting operation. The direction in which the counting operation is to be performed is determined according to the level of the signal received at the terminal A. In other words, there obtains an up-count mode when the level of the signal is high and a down-count mode when the level is low. For example, when the dial is turned round rightward, the up-down counter 60 performs an up-counting operation. Then, assuming that the dial turning degree corresponds to three pulses, the counted value of the counter becomes "3". As mentioned in the foregoing, the MI-COM 10 is repetitively detecting whether or not the counted value of the counter 60 has changed from zero. Then, every time this repeating action is performed, the MI-COM 10 takes in the counted value of the counter 60 and performs a resetting action. Therefore, the counted value of the counter 60 is reset when the MI-COM 10 detects that the counted value has reached "3".

In this instance, since the AE mode setting switch 74 is on, the counted value of the counter 60 is added to a data stored at the RAM 1 which is arranged to store information on the AE mode. Since the stored data of the RAM 1 has been "1" as mentioned above, the stored value of the RAM 1 changes to "4" with the counted value "3" added thereto. A subdivision of the AE mode, corresponding to the stored value "4" of the RAM 1 of FIG. 2B, is a normal program mode. The LCD display device 21 then makes a display as represented by FIG. 4C. If the dial (not shown) is then further turned rightward, signals are generated as shown in FIG. 3A. The counter 60 then performs an up-count operation. The MI-COM 10 adds the counted value of the counter 60 to the stored value of the RAM 1. The stored value of the RAM 1 then changes in a cycle in such a way as "4"→"5"→"1"→"2"→"3"→. When the AE mode setting switch is turned off with the AE mode in the state of the normal program, the MI-COM 10 resets the counted value of the counter 60 at "0" and then comes back to the standby mode. The LCD display device 21 makes a display as shown in FIG. 4G.

Next, when the MI-COM 10 detects that the light measuring mode setting switch 75 has been turned on, the embodiment operates as follows: With the MI-COM 10 detecting the on state of the light measuring mode setting switch 75 via the SWI/F 70 in the stand-by mode, the MI-COM 10 supplies the data stored at the RAM 2 to the drive circuit 20 via the data bus 100. This causes the LCD display device 21 to make a display corresponding to the content of the RAM 2 showing an applicable subdivision of the light measuring mode as represented by FIGS. 4D to 4F. The data to be stored by the RAM 2 and the subdivisions of the light measuring mode corresponding to these data are as shown in FIG. 2B. The light measuring mode can be set by turning a dial (not shown) to change the counted value of the counter 60 and by adding the counted value of the counter to the content of the RAM 2 in the same manner as in the case of the AE mode described in the foregoing. When the light measuring mode setting switch 75 is turned off, the above-stated operation of the MI-COM 10 comes to an end. The MI-COM 10 resets the counter 60 and the camera resumes the stand-by mode. The LCD display device 21 then makes a display as shown in FIG. 4G. FIG. 4D represents a display indicating an averaging photometry mode; FIG. 4E a display indicating a partial photometry mode; and FIG. 4F a display indicating a spot photometry mode.

When the MI-COM 10 detects that the film sensitivity setting switch 76 is turned on, the embodiment operates as follows: With the film sensitivity setting switch 76 found on by the MI-COM 10 via the SWI/F 70 in the stand-by mode, the MI-COM 10 supplies the drive circuit 20 via the data bus 100 with a data which is to be displayed by the LCD display device 21 as shown in FIG. 4K. The drive circuit 20 then causes the display device to make the display to inform the camera operator of the film sensitivity setting mode.

With the film sensitivity setting switch 76 kept in its on position, when the dial which is not shown is turned, the counted value of the counter 60 changes from a value "0". The counted value of the counter 60 is taken in by the MI-COM 10 and is added to the stored value of the RAM 3. The counter 60 is then reset. In response to the turning movement of the dial the switch 62 generates pulses. A number of pulses thus generated accordingly, as the dial is turned are supplied to the RAM 3. The MI-COM 10 supplies the data stored at the RAM 3 via the data bus 100 to the drive circuit 20. The drive circuit 20 causes the LCD display device 21 to make a display corresponding to the data stored at the RAM 3. For example, when the data stored at the RAM 3 is "3"

as shown in FIG. 2B, the display device makes the display as represented by FIG. 4K.

In case that the MI-COM 10 comes to detect the multi-exposure mode setting switch 79 as in its on position, the embodiment operates as follows: With the switch 79 thus found on via the SWI/F 70 while the embodiment is in the stand-by mode, the MI-COM 10 supplies the drive circuit 20, via the data bus 100, with a data to be displayed as shown in FIG. 4H. Accordingly, the LCD display device 21 makes the display as shown in FIG. 4H. This informs the camera operator that the camera is in the multi-exposure setting mode.

When the dial (not shown) is turned with the multi-exposure mode setting switch 79 kept on, the counted value of the counter 60 changes from "0". The counted value which has thus changed is taken in by the MI-COM 10 and is added to the data stored at the RAM 5. The counter 60 is reset concurrently with this addition. A value which is set by means of the dial is thus supplied to the RAM 5. For example, with the dial turned round, if two clock pulses are produced, for example, a value "2" is added to the data stored at the RAM 5. The initial stored data or value of the RAM 5 is "1". With the value "2" added to the initial value, the data stored at the RAM 5 becomes "3". The MI-COM 10 then has the LCD display device 20 driven on the basis of this data. As a result, the number of exposure performing steps of the multiple exposure is set as shown in 4I.

As described above, the AE mode setting switch 74, the light measuring mode setting switch 75 and the multi-exposure mode setting switch 79 are used in combination with the switches 61 and 62. Assuming that the AE mode is set at the normal program mode, the light measuring mode at the averaging photometry mode and the multi-exposure mode at a five step multiple exposure mode, the embodiment operates as described below:

Under this condition the MI-COM 10 causes a display to be made as shown in FIG. 4J. After selection of a photographing mode as mentioned in the foregoing, when the MI-COM 10 detects that the light measurement switch 71 has been turned on, the MI-COM 10 supplies the address bus 101 with a signal designating the AD converter 50. Following that, the data bus 100 receives a signal which causes the AD converter 50 to begin an AD converting operation on a photometric value obtained from the light measuring circuit 51 (for averaging photometry). The output of the light measuring circuit 51, which is a measured value obtained in an averaging photometric manner, is AD converted by the AD converter 50. Upon completion of the AD conversion, the output of the AD converter 50 is supplied to the MI-COM 10. The MI-COM 10 reads the result of the AD conversion via the data bus 100 and stores it at the RAM 8. The MI-COM 10 then performs an adding operation on the result of AD conversion which is stored at the RAM 8 and a data on the film sensitivity (ASA) stored at the RAM 3. A light measurement value Ev is then obtained as a result of the addition.

Since the normal program mode is selected as the AE mode in this instance, a computing operation is carried out, for example, in the following manner:

$$Tv = \tfrac{1}{2}(Ev - 2) \qquad (1)$$

$$Av = Ev - Tv \qquad (2)$$

wherein Tv represents a shutter speed and Av an APEX value of the aperture. Then, the computed Av and Tv values are supplied via the data bus 100 to the LED display device 31 and the drive circuit 30 and are also supplied to the RAM's 6 and 7. The LED display device 31 makes a display showing the Av and Tv values.

When the release switch 72 is turned on under this condition, the MI-COM 10 causes a photo-taking operation to be performed on the basis of the Av and Tv values stored at the RAM's 6 and 7. In this instance, since the multiple exposure is preset to be made in five steps, the MI-COM 10 controls the degree or amount of exposure of each step to be 1/5 of an adequate degree of total exposure required for the multiple exposure. More specifically stated, within the MI-COM 10, a computing operation is carried out in accordance with the following formula:

$$\begin{aligned}(\text{amount of exposure for each step}) = &\ (\text{light measurement value}) \times \\ &\ (\text{remaining amount of multiple exposure/} \\ &\ \text{remaining number of exposures for multiple exposure})\end{aligned} \qquad (3)$$

With the amount of each exposure performance step thus obtained, the computing operations of the formulas (1) and (2) shown in the foregoing are performed on the basis of the value of each exposure step. Then, the Av and Tv values thus obtained are stored at the RAM's 9 and 10, respectively. Further, referring to the formula (3), the amount of exposure for each step and the remaining amount of multiple exposure are applied to Formula (3) in the form of actual exposure values obtained by logarithmically expanding APEX values. Upon completion of the operation according to Formula (3), the amount of exposure for each step thus obtained is converted into an APEX value before it is applied to Formulas (1) and (2) for obtaining the Av and Tv values. Note that, at the first exposure of the multiple exposure, the "remaining amount of multiple exposure" is equal to the light measurement value Ev. This Ev value is supplied to the RAM 12 as the remaining amount of exposure in the form of an APEX value. At the first exposing step of multiple exposure, the logarithmically expanded value of this Ev value is handled in Formula (3) as the "remaining amount of multiple exposure". The Av and Tv values are thus obtained for the first step of the multiple exposure.

The MI-COM 10 further reads, via the SWI/F 70, a data produced through a switch 80 of four bits which is arranged to supply the MI-COM 10 with information on the maximum open aperture value of the lens. Then, a number of aperture controlling (adjusting) steps is computed in accordance with the following formula:

number of aperture control steps=data stored at RAM 9—max. open aperture value of the lens. The number of aperture control steps which is thus computed is stored at the RAM 11.

Following this, an instruction is given to the control circuit 40 to drive the AE control magnet 41. Then, the quick return mirror control magnet 42 is energized for a period of, say, 5 msec. With the magnet 42 thus energized, a mirror is lifted by a mechanism (not shown). An aperture control device (not shown) comes to operate. A switch 81, which is arranged to produce aperture operating pulses, repetitively turns on and off. Every time a shift of the aperture, operating pulse producing switch 81 from its off position, to its on position is detected, the MI-COM 10 reduces the number of aperture control steps stored at the RAM 11 by one. When the value stored at the RAM 11 reaches zero, the MI-COM 10 brings the driving operation of the AE control magnet 41 to a stop. Then, the aperture control operation is brought to an end by the action of a mechanism (not shown). After that, the shutter is controlled until aperture defining blades settle, with these blades brought to a stop by the delayed action of a magnet arrangement. The MI-COM 10 performs a counting operation on a program for a period of time according to a shutter speed value stored at the RAM 10 after the leading shutter curtain holding magnet 43 is energized. After the lapse of the shutter speed time, the trailing shutter curtain holding magnet 44 is energized to cause the trailing curtain to travel. Upon completion of the travel of the trailing shutter curtain, i.e. at the end of the exposure, the switch 78 turns on. The MI-COM 10 then detects the shift of the switch 78 to its on position and turns off the leading and training shutter curtain holding magnets 43 and 44.

Upon completion of the first performance of film exposure, the MI-COM 10 sets the multi-exposure flag at "1" and subtracts "1" from the stored data of the RAM 5 to make it "4". Further, the amount of the first exposure step obtained in an APEX value by the above-stated computation is subtracted from the stored data of the RAM 12 and the result of subtraction is stored at the RAM 12. The MI-COM 10 further detects whether or not the stored data of the RAM 5 is "0". If it is not "0", the MI-COM 10 supplies the control circuit 40 with a signal for effecting power supply only to the motor 45 which is arranged to charge aperture driving AE mechanism and the shutter. Since the stored data of the RAM 5 has been set at "4" as mentioned above, the motor 45 is alone driven to charge the AE mechanism and the shutter. Upon completion of the charging operation on the AE mechanism and the shutter, the switch 78 changes from its on position to an off position to supply the control circuit 40 with a signal for cutting off the power supply to the motor 45. Following this, the MI-COM 10 detects the positions of the light measurement switch 71 and the release switch 72. If the light measurement switch 71 is found on and the release switch 72 off, a display is caused to be made as shown in FIG. 4L. Since the multi-exposure flag is at "1" at that time, a part of this display "MULTI I" is caused to flicker as indicated in FIG. 4L. When the release switch 72 is turned on, a mechanism charging operation is performed after the film is exposed in the same manner as described in the foregoing. Then, "1" is further subtracted to change the stored data of the RAM 5 to "3". When the exposing step of the multi-exposure is performed a total of five times, the stored data of the RAM 5 becomes "0" and the multiple exposure operation comes to an end.

In setting the number of exposure performing steps of a multi-exposure operation, the display device 21 is caused to make a display of "MULTI I". If the film is exposed even once under that condition, the display "MULTI I" flickers to inform the camera operator that the multi-exposure operation has already begun.

Upon completion of the multi-exposure operation, the stored data of the RAM 5 becomes "0". Then, since the multi-exposure flag is at "1", the MI-COM 10 supplies via the data bus 100 the LED display device 31 with a data which causes the LED display device 31 to display "E" within a view finder as shown in FIG. 4O. The MI-COM 10, at the same time, detects that the stored data of the RAM 5 is at "0" and allows power supply to be effected by the control circuit 40 to the motor 45 which charges the AE mechanism and the shutter. At the initial stage of the power supply to the motor 45, a sudden and large transient current flows to the motor 45. After that, the MI-COM 10 produces a signal which causes power supply to be effected to the film winding motor 46. The motor 46 performs film winding. Upon completion of film winding, the switch 73 shifts from its on position to an off position. The MI-COM 10 detects via the SWI/F 70 the shift of the position of the switch 73 from the on position to the off position and then causes the film winding motor 46 to be brought to a stop. After completion of the multi-exposure operation, the MI-COM 10 causes the LCD display device 21 to make a display as shown in FIG. 4M. Further, after completion of film winding operation, if the switch 72 is found on, i.e. if the shutter release button is in its depressed state, the switch 72 is kept in that state. When the switch 72 turns off with the shutter button released from the depressed state, the multi-exposure flag is cleared. The camera shifts to the stand-by mode and the multi-exposure mode comes to an end.

In case that a preset number of performance times or steps is to be changed during the process of a multi-exposure operation after the multi-exposure mode is selected by means of the multi-exposure mode setting switch 79, the embodiment operates as follows: Let us assume that the initially set number of exposure times for the multiple exposure, which is set by means of the multi-exposure mode setting switch 79 and a dial which is not shown, is five. Under that condition, when one and the same frame of film is exposed twice, the stored data of the RAM 5 becomes "3". Meanwhile, the multi-exposure flag at the RAM 13 is at "1". The stored data at the RAM 12 which is arranged to store the remaining amount of exposure is at 3/5 of the light measurement value Ev. Then, the initially set number of exposure performing times or steps can be changed under that condition by turning the multi-exposure mode setting switch 79 on and by turning round a dial which is not shown. If the initially set number of times is to be increased during the process of the multi-exposure operation, the dial which is not shown is turned to the right. This causes the switches 61 and 62 to produce pulses as shown in FIG. 3A. As a result, the stored data at the RAM 5 increases. Then, with the initially set number of times assumed to be five as mentioned above, if it is desired to have this number increased to seven after exposure has been performed twice, the switches 61 and 62 are caused to produce two pulses. The two pulses are then added to the stored data of the RAM 5 to make it "5". Therefore, after that point of time, the remaining number of exposure performance steps increases from three to five. In this instance, since the remaining content of the RAM 12 immediately before this change has been 3/5 of the light measurement value, the remaining amount of exposure can be expressed as light measurement value × 3/5. With this value logarithmically expanded and substituted in the above-stated Formula (3), the amount of exposure per performance of the remaining steps of the multi-exposure operation becomes as expressed by the following formula:

$$\frac{\text{light measurement value} \times 3/5}{5} = \frac{\text{light measurement value} \times 3}{25}$$

wherein said "light measurement value" means an actual exposure value obtained by logarithmically expanding an APEX value Ev.

In the event of decreasing the number of exposure performing times or steps of a multi-exposure operation during the process of the operation, the above-stated dial which is not shown is turned round to the left instead of to the right. This causes the switches 61 and 62 to produce pulses as shown in FIG. 3B. Again assuming that the initial set number of exposure times is five, if this is to be decreased by two after the exposure step has been performed twice, two pulses are caused to be produced as shown in FIG. 3B. Then, "2" is subtracted from the remaining stored value of the RAM 5 to make the latter into "1". After that, therefore, the remaining number of exposure times becomes one instead of three. The remaining amount of exposure can be computed according to Formula (3) in the same manner as described in the foregoing. In other words, it becomes as shown below:

$$(\text{light measurement value}) \times \frac{3/5}{1} = (\text{light measurement value}) \times 3/5$$

In accordance with the above-stated arrangement, the total amount of multiple exposure remains unchanged even in cases where the preset number of exposure performing steps is changed during the process of the multi-exposure operation. The embodiment thus ensures an adequate amount of multiple exposure as a whole, so that an under-exposed or over-exposed picture can be effectively prevented.

The details of the operation described above are as described below with reference to FIG. 5A which shows the operation in a flow chart:

With the multi-exposure mode selected by turning on the multi-exposure mode setting switch 79, a setting operation on the number of exposing times of multi-exposure performance is accomplished according to the flow chart. At a step (a), it is first detected whether multiple exposure has already begun by checking the multi-exposure flag to see whether it is at "1". If it has not yet begun, the operation proceeds to a step (b). If it has already begun, the operation proceeds to a step (c). At the step (b), if the set number of exposure performances is allowed to become "0", the film would be automatically wound up through a sequence of steps (d), (e), (f) and (g) without being exposed to light. To prevent this from occurring, the setting number of exposure performances is arranged to be settable between "1" and "99" not including "0" at the step (b). In case that the exposure performance has been made even once, the multi-exposure mode can be reset by setting the setting number of performances at "0". In that instance, the multi-exposure mode is reset with the film automatically wound up through the sequence of steps (d), (e), (f) and (g). Accordingly, with multiple exposure setting performed, the number of exposures becomes "1". At the step (d) the set number of times of multipe exposure performances is displayed as it is at the LCD display device 21.

At the step (e), it is determined whether or not the setting operation on the number of performances of multiple exposure is to be carried on. More specifically, the operation comes back to the step (a) to set a number of multiple exposure performances if the multi-exposure mode setting switch 79 is on or proceeds to the next step (f) if the switch 79 is found off.

At the step (f), it is examined whether the set number of times of multiple exposure is at "0". If not, the setting operation on multiple exposure is brought to an end. If the set number of times is "0", the operation proceeds to the step (g).

At the step (g), film winding is performed. Here, one frame portion of the film is arranged to be wound up.

Figure 5A:
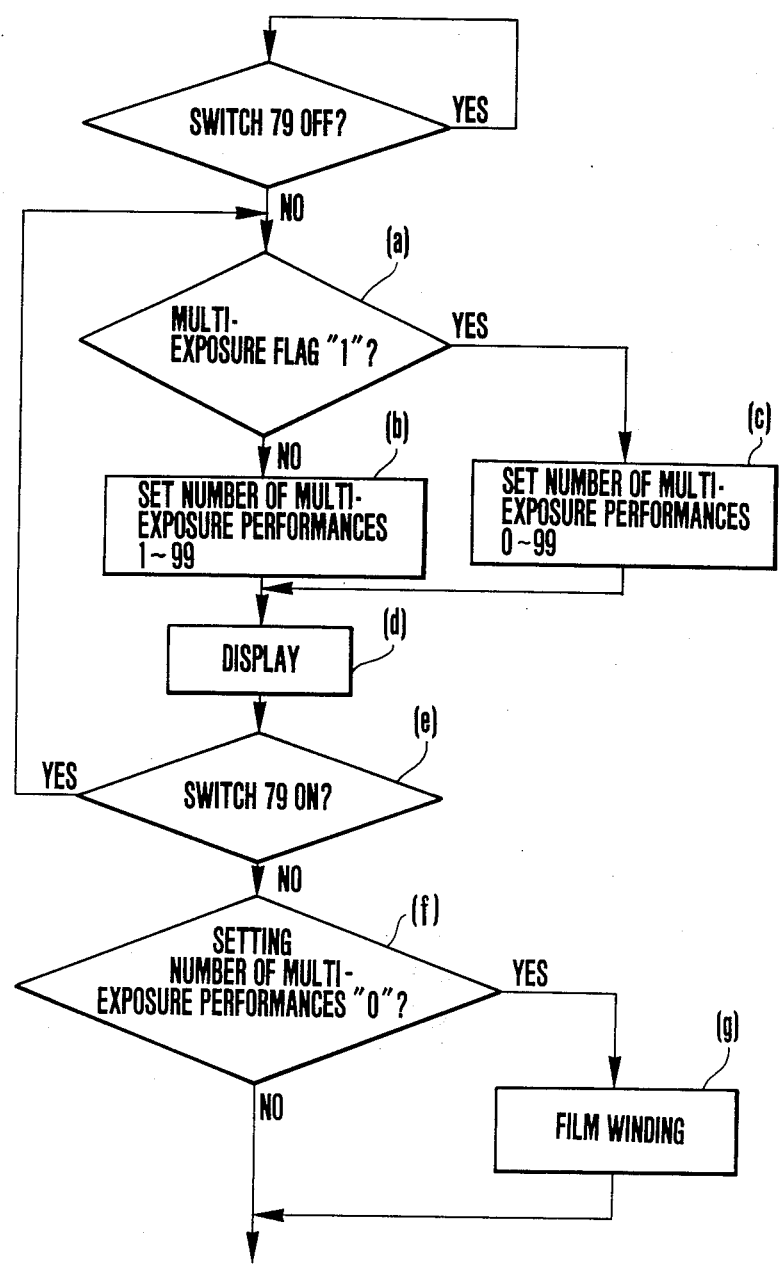
Figure 5B:
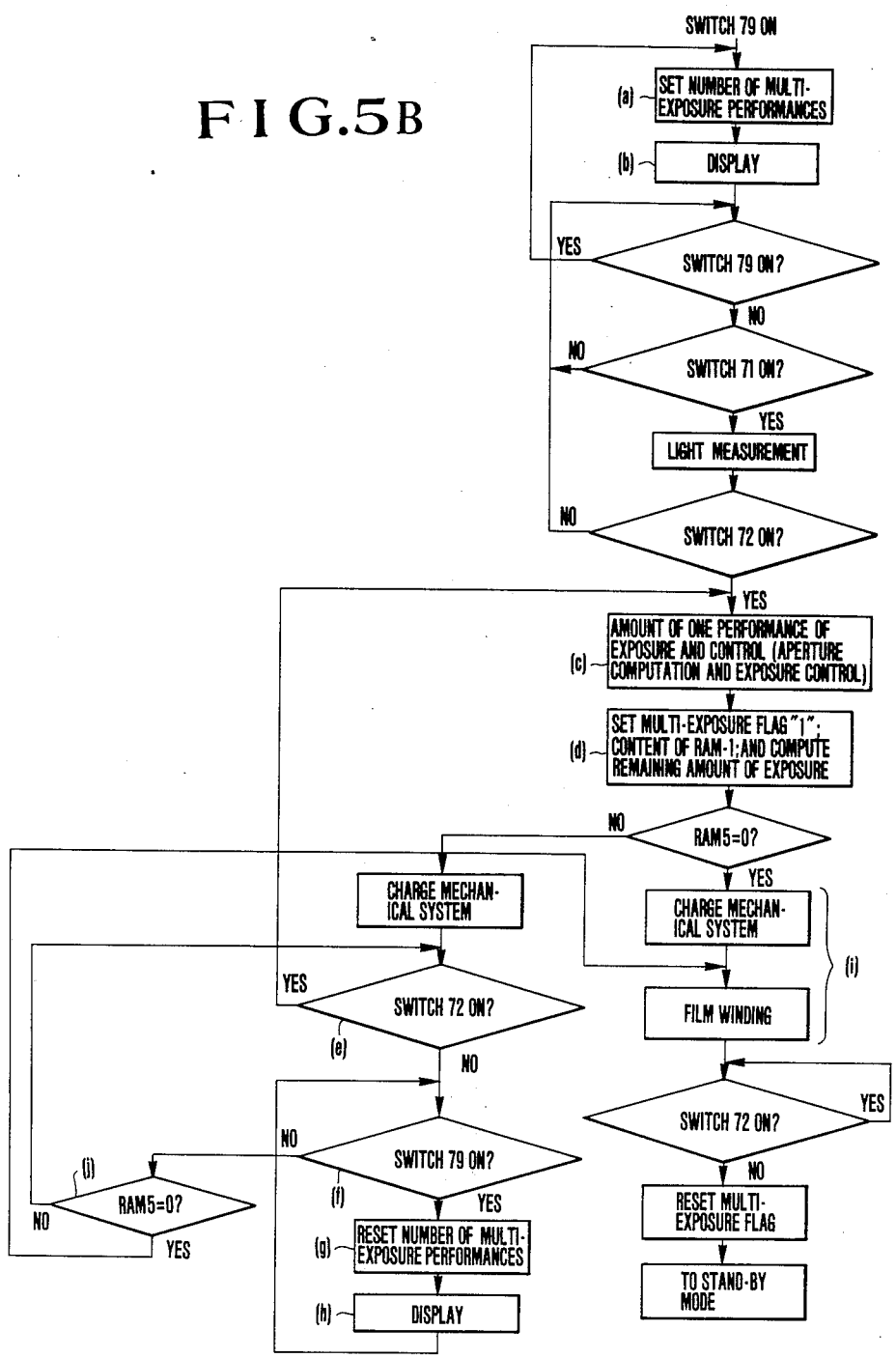

FIG. 5B is another flow chart showing the details of the operation in the multi-exposure mode shown in the flow chart of FIG. 5A. When the multi-exposure mode is set with the switch 79 turned on, the switches 61 and 62, which are mentioned in the foregoing, are detected in their on positions. The stored data at the RAM 5 is increased or decreased to set thereby a number of exposing times of multiple exposure and the set value is displayed at steps (a) and (b). After this, when the switch 71 is turned on, a light measurement value Ev is taken in and the switch 72 is turned on. Then, at a step (c), amount of exposure per exposure performance is computed on the basis of the light measurement value and the preset value of the above-stated number of exposing times of multiple exposure. Each performance of exposure is controlled on the basis of a computed value thus obtained. Following this, at a step (d), the multi-exposure flag is set at "1". A value 1 is subtracted from the stored data at the RAM 5 to obtain a remaining number of exposure performances of the multi-exposure operation. Further, the remaining amount of exposure is obtained. After that, it is checked whether the stored data of the RAM 5 has become "0", that is, whether or not the multi-exposure performance has been carried out the preset number of times. Then, if the stored data is found not "0", a charging operation is performed on the mechanical system, which includes the AE mechanism and the shutter system, to prepare them for a next exposure performance. At a next step (e), the position of the switch 72 is checked. If the switch 72 is found on, i.e. if the shutter release button still remains in a depressed state, the operation of the embodiment shifts back to the step (c) to carry on the above-stated operation until the stored data at the RAM 5 becomes "0", that is, until the multi-exposure is performed the preset number of times. Further, if the switch 72 is found off at the step (e), that is, if the shutter release button is found having been released from its depressed state, the switch 79 is checked to see whether it is on at a next step (f). If the switch 79 is found not on, the processes of the steps (e) and (f) are repeated. Under this condition, if the shutter release button is again pushed downward to turn the switch 72 on, the processes of the step (c) and steps subsequent thereto are repeated. In other words, each of exposure performances is performed to a degree controlled on the basis of the computed amount of exposure per exposure performing step every time the shutter release button is pushed down. In case that the switch 79 is found on, that is, if the multi-exposure mode is newly set during the process of the current multi-exposure operation, steps (g) and (h) are carried out to change the stored data, i.e. the remaining number of exposure performance steps, in the same manner as at the steps (a) and (b). When the shutter release button is pushed down after that, the operation of the embodiment shifts to the step (c). Then, the amount of exposure per performance is computed for the newly set number of multiple exposure performance steps. Then, each performance of exposure is controlled on the basis of the computed amount thus obtained.

Upon completion of the last of the preset number of exposure performances during the multi-exposure operation, the stored data at the RAM 5 becomes "0". Then, the operation of the embodiment shifts to a step (i). At the step (i), the mechanical system of the camera is charged and film winding is performed to bring the multi-exposure operation to an end. After that, the switch 72 is checked. If the switch 72 is found on, the embodiment is kept in the above-stated state until the switch turns off. Therefore, with the preset number of exposure performances of the multi-exposure operation having come to an end, no further exposure is allowed even if the shutter release button is kept depressed. This arrangement effectively prevents the film from being wasted by any unnecessary exposure that otherwise might follow the end of the multi-exposure operation. Further, in case that the switch 72 is found off after the end of the multi-exposure operation, that is, if the shutter release button has been released from the depressed state at that time, the multi-exposure flag is reset. The embodiment shifts to the above-stated stand-by mode and the sequence of processes in the multi-exposure mode come to an end.

Figure 5C:
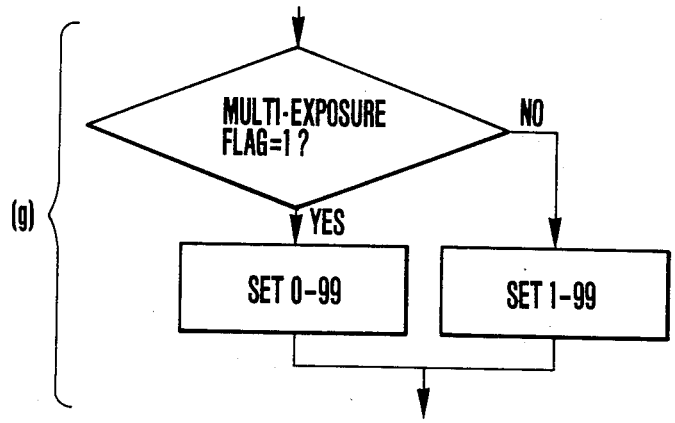

Further, in setting the number of exposing times of multiple exposure at the steps (a) and (g) of FIG. 5B, the multi-exposure flag is checked to see whether it has been set at "1" or not as shown in FIG. 5C. If the flag is found having been set at "1", the number of exposing times of multiple exposure performance is allowed to be set at "0". In case where the number of times of multi-exposure performance is set at "0" at the step (g) during a multi-exposure operation, it is found at the step (j) of FIG. 5B that the stored data of the RAM 5 is at "0". Film winding is then immediately carried out. In this instance, therefore, the multi-exposure operation is brought to an end and the number of exposing times is set at "0" at the step (g). The multi-exposure operation can be thus cancelled.

In the case of the flow chart of FIG. 5B, the multi-exposure mode is arranged to be carried out in a continuous manner. However, in case that the multi-exposure mode is desired to be carried out in a single shooting or incontinuous manner with the switch 77 in an off position, the operation of the embodiment is as follows: In this case, a step (k) is added before the step (e) of the flow chart of FIG. 5B in carrying out the program.

Figure 5D:
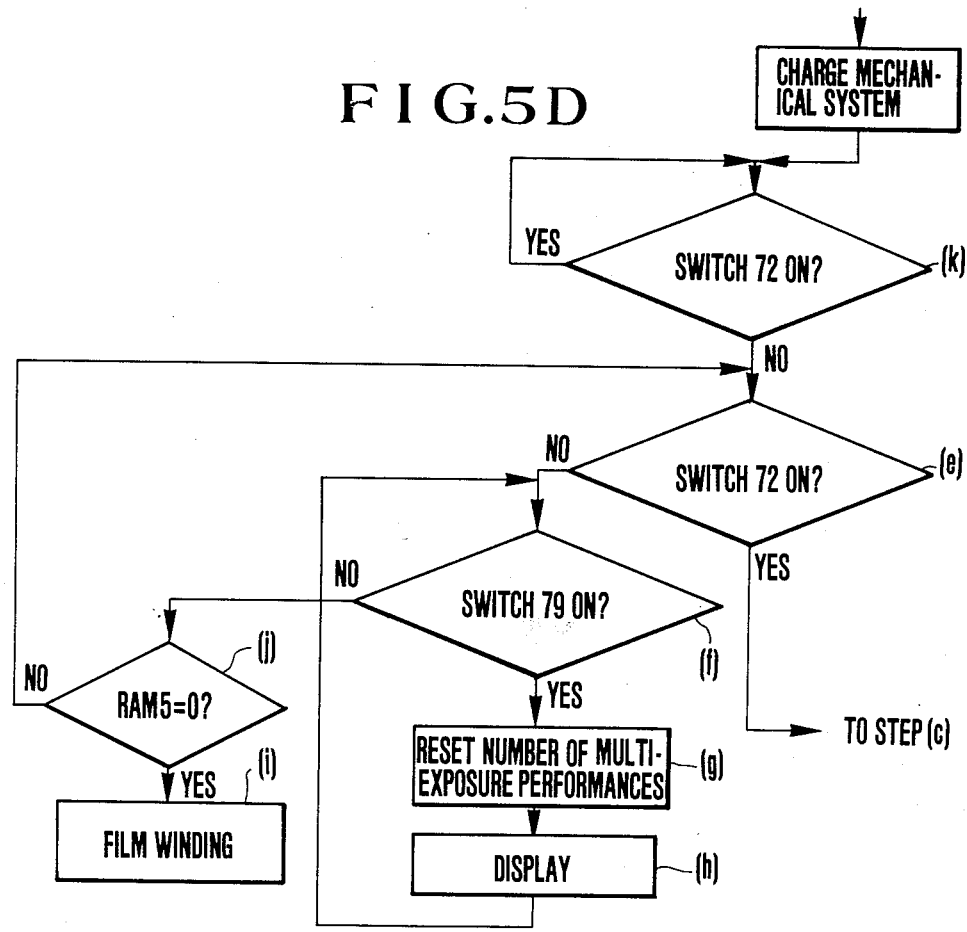

FIG. 5D is a flow chart partially showing the operation in the above-stated single shooting manner. The rest of the operation is idential with the flow chart of FIG. 5B. In this case, with the mechanical system charged after completion of the first performance of exposure, the switch 72 is checked to find whether it is on at the step (k). The operation of the embodiment does not proceed to the step (e) from the step (k) until the switch 72 turns on. In the case of the single or incontinuous multi-exposure mode, therefore, the exposure performance comes to a stop even when the shutter release button is not released from its depressed state. The operation proceeds to the step (e) when the shutter release button is released from the depressed state. After that, the embodiment carries out the sequence of steps subsequent to the step (e) as shown in FIG. 5B.

FIGS. 5E to 5G are flow charts respectively showing the details of the mechanical system charging operation, the film winding operation and the setting operations for setting the number of exposing times of multiple exposure. These operations are carried out in the manner as shown in these flow charts.

Figure 6:
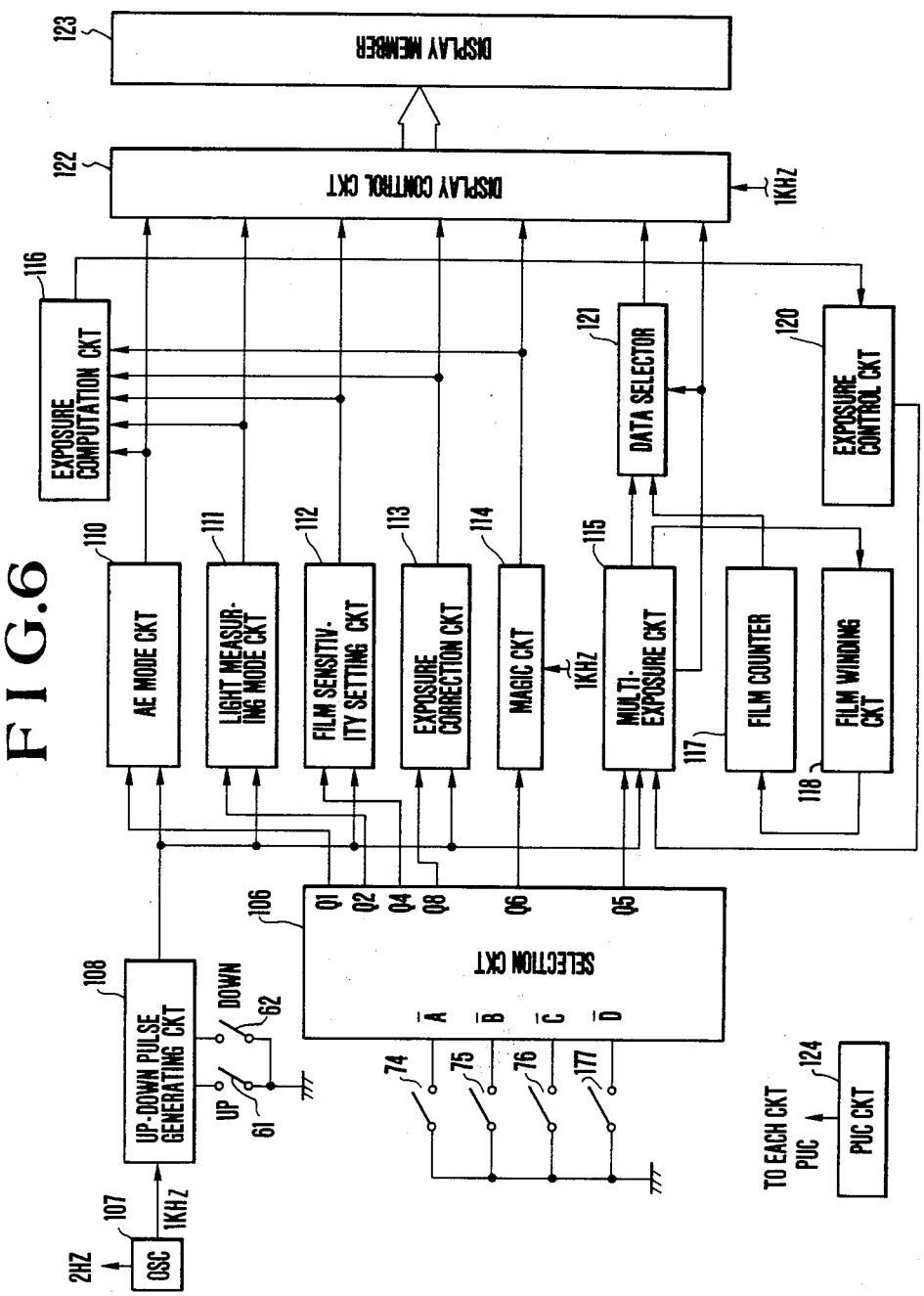
FIG. 6 is a circuit block diagram showing a camera arranged as a second embodiment of this invention.

In the embodiment described, the multi-exposure operation is controlled according to a software using the micro-computer. Whereas, an embodiment of this invention, wherein a multi-exposure operation is to be accomplished by a hardware, is arranged as described below with reference to FIG. 6:

FIG. 6 is a circuit block diagram showing a second embodiment of this invention. In FIG. 6, the elements which are arranged to perform the same functions as those of the corresponding ones shown in FIG. 1 are indicated by the same reference numerals and symbols and the details of them are omitted from description given below:

The illustration in FIG. 6 includes a selection circuit 106 arranged to select an AE mode setting switch 74; a light measuring mode setting switch 76; an AE mode circuit 110, whereby a signal of a correction switch, which is assumed to be a binary signal, is converted into a decimal signal of a corresponding decimal value; a light measuring mode circuit 111; a film sensitivity setting circuit 112; an exposure correction circuit 113; a magic circuit 114; and a multi-exposure circuit 115.

Figure 11:
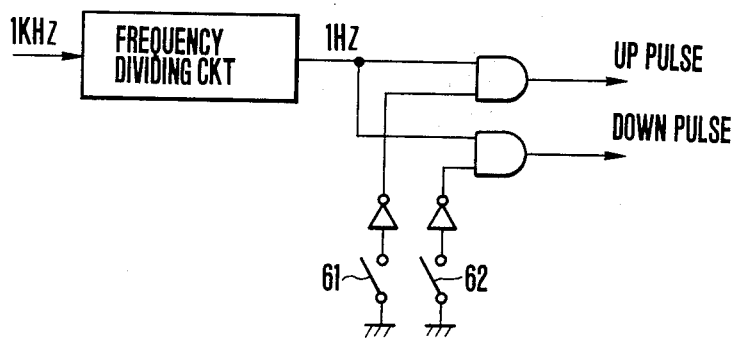
FIG. 11 is a circuit diagram showing the arrangement of a pulse generating circuit included in embodiment shown in FIG. 6.

The circuits to be selected by the selection circuit 106 are arranged to permit counting of up-count and down-count pulses produced from an up-down pulse generating circuit 108 and to enable a display control circuit 122 to make a display indicative of each counted value thus obtained. Information set at each of these circuits is transmitted to an exposure computation circuit 116. The computation circuit 116 is arranged to perform an exposure computing operation on the basis of the information thus received. A clock pulse generating circuit 107 is arranged to produce clock pulses of frequency values 2 Hz and 1 KHz. The above-stated up-down pulse generating circuit 108 is arranged to produce a signal for increasing or decreasing the contents of the circuits 110 to 113 and 115 according to the modes set by means of the switches 61 and 62. The AE mode circuit 110 is arranged to permit selection of one of various AE modes including a program mode, a shutter speed preference mode, etc. The light measuring mode circuit 111 is arranged to permit selection of one of various light measuring modes including the averaging photometric mode, the partial photometric mode and the spot photometric mode. The film sensitivity setting circuit 112 is arranged to permit setting of a film sensitivity value. The exposure correction circuit 113 is arranged to permit setting of a number of steps by which an exposure value is to be adjusted according to an apposite exposure value. The magic circuit 114 is arranged to permit determination as to whether or not a magic photographing operation is to be performed. The multi-exposure circuit 115 is arranged to permit setting of a number of times of exposure performance to be made in the multi-exposure mode. A film counter 117 is arranged to count how many frame portions of film have been used for photographing by detecting how many times a film winding circuit 118 has produced a winding completion signal therefrom. A data selector 121 is arranged to transmit information on the number of exposing times of a multiple exposure set by the multi-exposure circuit 115 and the number of photographed frame portions of film counted by the film counter 117 to the display control circuit 122. The selector 121 supplies the display control circuit 122 with the information on the number of exposure performing times of a multiple exposure when the embodiment is set into the multi-exposure mode and with information on the number of used, or exposed, frame portions of film counted by the film counter 117. An exposure control circuit 120 is arranged to control shutter time and aperture values on the basis of exposure control information produced from an exposure computation circuit 116 and supplies the multi-exposure circuit 115 with a signal, the level of which becomes high when the film is exposed to light. The display control circuit 122 is arranged to control a display member 123 in response to the output of each of circuits which are connected to the circuit 122. A power up clear (PUC) circuit 124 is arranged to produce a PUC signal which resets each of circuits when power supply is switched on. Further, the details of the pulse generating circuit 108 are arranged, for example, as shown in FIG. 11 and produces up or down pulses when the switch 61 or 62 is on.

Figure 7:
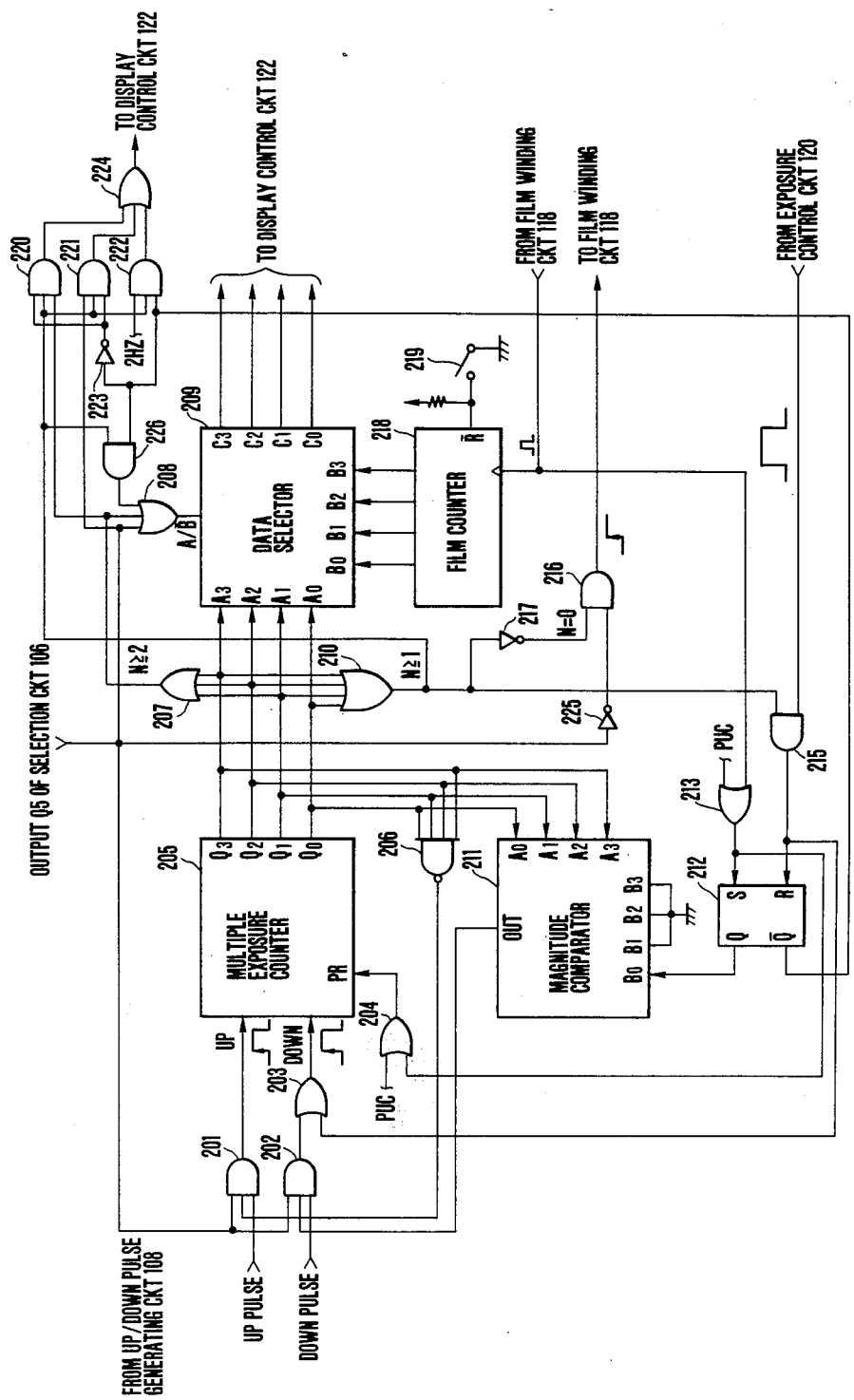
FIG. 7 is a circuit diagram showing the details of a multi-exposure circuit 115, a data 121 and a film counter 117 included in FIG. 6.

The details of the multi-exposure circuit 115, the data selector 121 and the film counter 117 are arranged as described below with reference to FIG. 7:

Referring to FIG. 7, a multi-exposure counter 205, which is a four bit binary counter, is arranged to perform up counting and down counting operations according to pulses coming through AND and OR gates 201 and 203. The OR gate 203 has one input terminal thereof connected to an AND gate 202 and the other input terminal to the output terminal of another AND gate 215. The output terminals Q0 to Q3 of the counter 205 are connected to a NAND gate 206. The output terminal of the NAND gate 206 is connected to the AND gate 201. When all the outputs Q0 to Q3 of the multi-exposure counter 205 are at high levels, i.e. when the counter 205 performs up counting, the output level of the NAND gate 206 becomes low. Then, the level of the output of the AND gate 201 becomes low to bring the up counting operation of the counter 205 to a stop. A magnitude comparator 211 is arranged to compare a digital value coming to the terminals A0 to A3 thereof with a digital value coming to the terminals B0 to B3 thereof. When these digital values coincide with each other, the magnitude comparator 211 produces a low level signal. When they do not coincide with each other, the comparator 211 produces a high level signal.

The input terminals B1 to B3 of the magnitude comparator 211 are grounded and are at a low level. Meanwhile, the input terminal B0 is connected to the output terminal Q of an RS flip-flop (RS-FF) 212.

The RS-FF 212 is arranged to be set by the output of an OR gate 213 and to be reset by the output of the AND gate 215. The OR gate 213 has one of the input terminals thereof connected to the output terminal of the power up clear circuit 124 and the other is arranged to receive counted pulses produced from the film winding circuit 118. One of the input terminals of the AND gate 215 is connected to an OR gate 210 and the other, to the output terminal of the exposure control circuit 120 which produces a high level signal while the film is exposed.

The input terminal B0 of the magnitude comparator 211, therefore, receives a high level signal before a multiple exposure is performed and a low level signal when the multiple exposure is performed. An OR gate 207 is arranged to produce the OR of the outputs Q1 to Q3 of the multi-exposure counter 205. The OR gate 207 thus produces a high level signal when the counted value of the multi-exposure counter 205 is "2" or larger than "2". The OR gate 210 is arranged to produce the OR of the outputs Q0 to Q3 of the multi-exposure counter 205. The OR gate 210 produces a high level signal when the counted value of the multi-exposure counter 205 is "1" or larger than "1". An OR gate 208 is arranged to produce the OR of the output Q5 of the selector circuit 106 and the outputs of the OR and AND gates 207 and 226. A data selector 209 is arranged to selectively produce from output terminals C0 to C3 thereof the output of the multi-exposure counter 205 and that of a film counter 218 according to the signal supplied to the OR gate 208. The data selector 209 selects the output of the multi-exposure counter 205 when the output of the OR gate is at a high level and selects the output of the film counter 218 when the output of the OR gate 208 is at a low level. An inverter 217 is arranged to invert the output of the OR gate 210. Accordingly, when the output level of the inverter 217 is high, the counted value of the multi-exposure counter 205 is at "0".

An AND gate 220 is arranged to produce the AND of the outputs of the OR gate 210, an inverter 223 and the OR gate 207. An AND gate 221 is arranged to produce the AND of the output Q5 of the selection circuit 106, that of the OR gate 210 and that of the inverter 223. An AND gate 222 is arranged to produce the AND of the output of the OR gate 210, the inversion output $\bar{Q}$ of the RS FF 212 and a signal of 2 Hz produced from the clock pulse generating circuit 107. An OR gate 224 is arranged to produce the OR of the outputs of AND gates 220, 221 and 222. When the level of the output of the OR gate 224 becomes high, the display control circuit 122 causes the display member 123 to make a display reading "MULTI".

The film counter 218 is arranged to count pulses which are produced one by one every time one frame portion of film is wound up and to be reset by a back lid switch 219.

The embodiment which is arranged as described above operates as follows: When the AE mode setting switch 74 and the film sensitivity setting switch 76 are turned on, the selection circuit 106 makes the level of the output Q5 thereof high to select thereby the multi-exposure circuit 115. The embodiment thus set the camera into the multi-exposure mode. This signal causes the OR gate 208 to produce a high level signal. Since the counted value of the multi-exposure counter 205 has been set at "1" when power supply is switched on, the data selector 209 supplies the counted value "1" of the multi-exposure counter 205 to the display control circuit 122 in response to the output of the OR gate 208. Further, since the counted value of the counter 205 is "1", the output level of the OR gate 210 also becomes high. The level of the output of the inverter 223, inverting the output $\bar{Q}$ of the RS-FF 212, which has been set with the power supply switched on, also becomes high. While the output Q5 is at a high level, the levels of outputs of the AND gate 221 and the OR gate 224 become high. As a result of this, a signal is supplied to the display control circuit 122 to cause it to make a display "MULTI". Accordingly, the display control circuit 122 in turn causes the display member 123 to make a display as shown in FIG. 4H. The display informs the camera operator that the multi-exposure setting operation has been accomplished. When the switches 74 and 76 are turned off under this condition, the level of the output Q5 of the selection circuit 106 becomes low. The levels of the outputs of the OR gates 208 and 224 also become low. This cancels the setting of multiple exposure. In case that the up/down pulse generating circuit 108 is caused to produce, for example, four pulses by turning the switch 61 on when the switches 74 and 76 are turned on, the multi-exposure counter 205 receives the four pulses via the AND gate 201. Accordingly, the counted value of the multi-exposure counter 205 becomes "5". Then, the level of the outputs Q0 and Q2 becomes high while the level of other outputs is low. The AND gate 221 produces a high level signal under this condition. This results in the display reading "MULTI". The level of the output of the OR gate 207 remains high even if the switches 74 and 76 are then turned off. The AND gate 220 produces a high level signal to keep "MULTI" on display indicating completion of the multiple exposure setting operation. When an exposure is performed by the exposure control circuit 120 under this condition, a pulse signal which is at a high level while the film is exposed is produced from the circuit 120 and is supplied to the AND gate 215. Since the output level of the OR gate 210 at that time is high, the output level of the AND gate 215 becomes high. The RS-FF 212 is reset by the high level output of the AND gate 215. The level of the output Q of the RS-FF 212 then becomes low. Therefore, all the terminals B0 to B3 of the magnitude comparator 211 come to receive low level inputs. Concurrently with that, the output of the AND gate 215 is applied, via the OR gate 203 to the multi-exposure counter 205 to cause thereby the counter 205 to perform a down counting operation. The down counting operation is performed according to the fall of the pulse signal which remains at a high level while the film is being exposed to light.

When the RS-FF 212 is reset, the level of the output $\bar{Q}$ thereof becomes high. Therefore, the output level of the AND gate 220 becomes low. Whereas, the AND gate 222 produces a high level signal of 2 Hz. As a result, the display "MULTI" flickers to indicate that the multi-exposure operation is still in process as shown in FIG. 4L. With the exposure performance repeated, when the counted value of the multi-exposure counter 205 reaches "0", the output level of the OR gate 210 changes from a high level to a low level. The output level of the inverter 217 changes from a low level to a high level. At that time, if both the AE mode setting switch 74 and the film sensitivity setting switch 76 are not in their on positions, the output Q5 is at a low level. Therefore, in that instance, one of the input terminals of the AND gate 216 is receiving a high level signal. With the output level of the inverter 217 having changed from a low level to a high level, the output level of the AND gate 216 also changes from a low level to a high level to give a winding start signal to the film winding circuit 118. Upon completion of film winding, a pulse is supplied from the winding circuit 118 to the film counter 218 to increase the counted value of the counter 218 by one. Meanwhile, since the counted value of the multi-exposure counter 205 becomes "0" and the output level of the OR gate 210 changes from a high level to a low level, the output level of all the AND gates 220, 221 and 222 become low. The output level of the OR gate 224 also becomes low. The display "MULTI", therefore, disappears to inform the camera operator of the end of the multi-exposure operation. At this instance, the output level of the OR gate 210, which decides whether the information of the multi-exposure counter 205 or the information of the film counter 218 is to be transmitted to the display control circuit 122, also changes from a high level to a low level in synchronism with the change of the output level of the OR gate 210 from the high level to the low level. This change thus causes the data selector 209 to transmit the information on the counted value of the film counter 218 to the display, control circuit 122. Therefore, the display indicative of the number of exposure performances for multiple exposure, is shifted to a normal display as shown in FIG. 4M. Further, the RS-FF 212 is set by a pulse coming from the film winding circuit 118. The counted value of the multi-exposure counter 205 is set at "1".

Therefore, when the AE mode setting switch 74 and the film sensitivity setting switch 76 are again turned on for the purpose of perfoming a multiple exposure, the number of performances of the multiple exposure is preset at "1" irrespectively of the on and off operations of the switches 61 and 62.

Next, in case that a multi-exposure operation is to be cancelled while the operation is in process and before the end of the operation, the embodiment operates as follows:

Let us assume that the AE mode setting switch 74 and the film sensitivity setting switch 76 are turned on; the multi-exposure circuit 115 is selected by the selection circuit 106; a suitable number of exposure performing times is set by the switch 61 for a multiple exposure; and then the film is exposed some number of times after the switches 74 and 76 are turned off. Under this condition, the RS-FF 212 is in a reset state in the same manner as described in the foregoing. The output Q of the RS-FF 212 is at a low level. The inputs B0 to B3 of the magnitude comparator 211 are at "0". Then, if the counted value of the multi-exposure counter 205 is a value other than "0", the output of the comparator 211 is at a high level.

When the switches 74 and 76 are turned on under this condition, the level of the output Q5 of the selection circuit 106 becomes high. Further, if the switch 62 is turned on, down pulses are supplied via the AND gate 202 to the multi-exposure counter 205. The counted value of the multi-exposure counter 205 is then subtracted by the down pulse input. When the counted value of the multi-exposure counter 205 becomes "0" with the subtraction proceeding, the level of the output of the magnitude comparator 211 changes from a high level to a low level. The AND gate 202 is closed. Then, the counted value of the multi-exposure counter 205 cannot be subtracted any further even when the switch 62 is turned on.

With the counted value of the multi-exposure counter 205 becoming "0" the output of the OR gate 210 changes from a high level to a low level. The output level of the inverter 217 thus changes from a low level to a high level. Then, if either the AE mode setting switch 74 or the film sensitivity setting switch 76 is turned off, the level of the output Q5 of the selection circuit 106 changes from a high level to a low level. Accordingly, the output level of the AND gate 216 becomes high. A film winding operation is performed in the same manner as described in the foregoing. The camera is released from the multi-exposure mode and comes back to a normal mode.

In accordance with the arrangement of the embodiment described, a desired number of exposures of a multi-exposure operation is set at a counter before the multi-exposure operation. In this instance, the multi-exposure setting can be cancelled even during the process of the multi-exposure operation. For such cancellation, the counted value of the counter representing the set number of exposure performances can be brought to "0" despite of the multi-exposure operation and the film is automatically wound up. The embodiment, unlike the conventional arrangement, thus permits a multi-exposure operation to be readily cancelled without necessitating any complex operation while the multi-exposure operation is in process. Further, in accordance with the arrangement of the embodiment, the content of the counter for setting the number of multi-exposure performing steps is automatically preset at "1" when the switches 74 and 76 are turned on. Then, if it is not necessary to change this preset number of multi-exposure performing steps, the multi-exposure setting can be automatically cancelled by just turning off one or both of the switches and without unnecessarily carrying out any exposure.

As described in the foregoing, with the camera set in the multi-exposure mode, the invented arrangement makes a display reading "MULTI" by means of the LCD display device 21 in the first embodiment and by means of the display member 123 in the case of the second embodiment. This display "MULTI" is arranged to flicker when an exposure is actually performed under the above-stated condition. However, this arrangement may be changed to have the display flicker when the camera is set into the multi-exposure mode and to have it stop flickering only when an exposure is actually perforced.

Further, the arrangement to make the display "MULTI" may be replaced with a different display arrangement which shows only the number of exposure performing times or steps under the multi-exposure mode setting condition and to show a deducted number of exposure performing times with flickering each time an exposure is performed. Further modifications is of course possible in accordance with this invention including an arrangement which not only flickers the display but also changes the color of the display or makes some suitable addition to the display.

Figure 8:
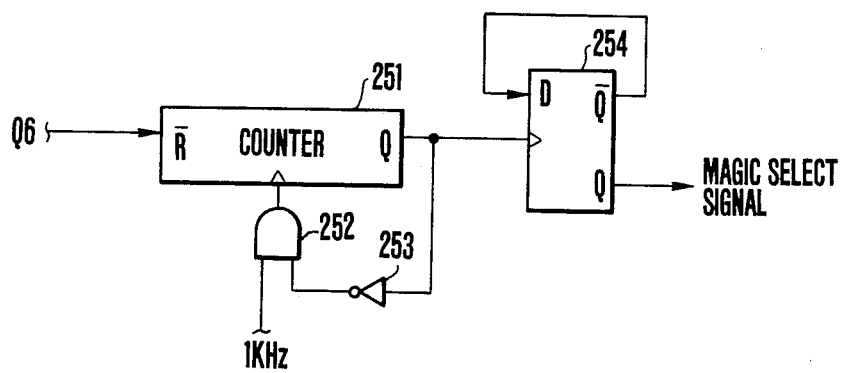
FIG. 8 is a circuit diagram showing the details of a magic circuit 114 included in FIG. 6.

The details of the magic circuit 114 included in FIG. 6 are arranged as described below with reference to FIG. 8 which shows the details of the circuit 114:

Referring to FIG. 8, a counter 251 is arranged to be released from a reset state when the level of a reset input R becomes high. The counter 251 then counts 1000 times, pulses of 1 KHz coming from an AND gate 252. After completion of counting 1000 pulses, the counter 251 produces an output Q at a high level. A D flip-flop (D-FF) 254 is arranged to latch its output $\overline{Q}$ which is being supplied to its input terminal D in response to a signal received from the output terminal Q of the counter 251. The magic circuit 114 further includes an inverter 253.

Referring to FIG. 6, when the light measuring mode setting switch 75 and the film sensitivity setting switch 76 are turned on, a high level signal is produced from the output terminal Q6 of the selection circuit 106. In this specific embodiment, when the switches 75 and 76 are turned on and kept in the on positions thereof over a period of one second, the output level of the counter 251 changes from a low level to a high level. Then, the AND gate 252 of the magic circuit 114 is closed via the above-stated inverter 253. With the AND gate 252 closed, the counting operation of the counter 251 comes to a stop. The level of the output of the counter 251 changes from a low level to a high level. Then, the output Q of the D-FF 254 also changes from a low level to a high level and is latched. The camera is thus set into the magic photographing mode. A display is made in a manner as shown in FIG. 4N.

With the light measuring mode setting switch 75 and the film sensitivity setting switch 76 both turned on, if this condition is cancelled within a period of one second, the output level of the counter 251 does not change from a low level to a high level. Accordingly, the level of the output Q of the D-FF 254 does not change from a low level to a high level and the camera is not set into the magic photographing mode.

Therefore, in turning the light measuring mode setting switch 75 on for the purpose of obtaining the light measuring mode, even if the film sensitivity setting switch 76 is erroneously turned on together with the switch 75, the magic photographing mode never obtains unless both of the switches are kept on for a period of time longer than a predetermined length of time.

Figure 9:
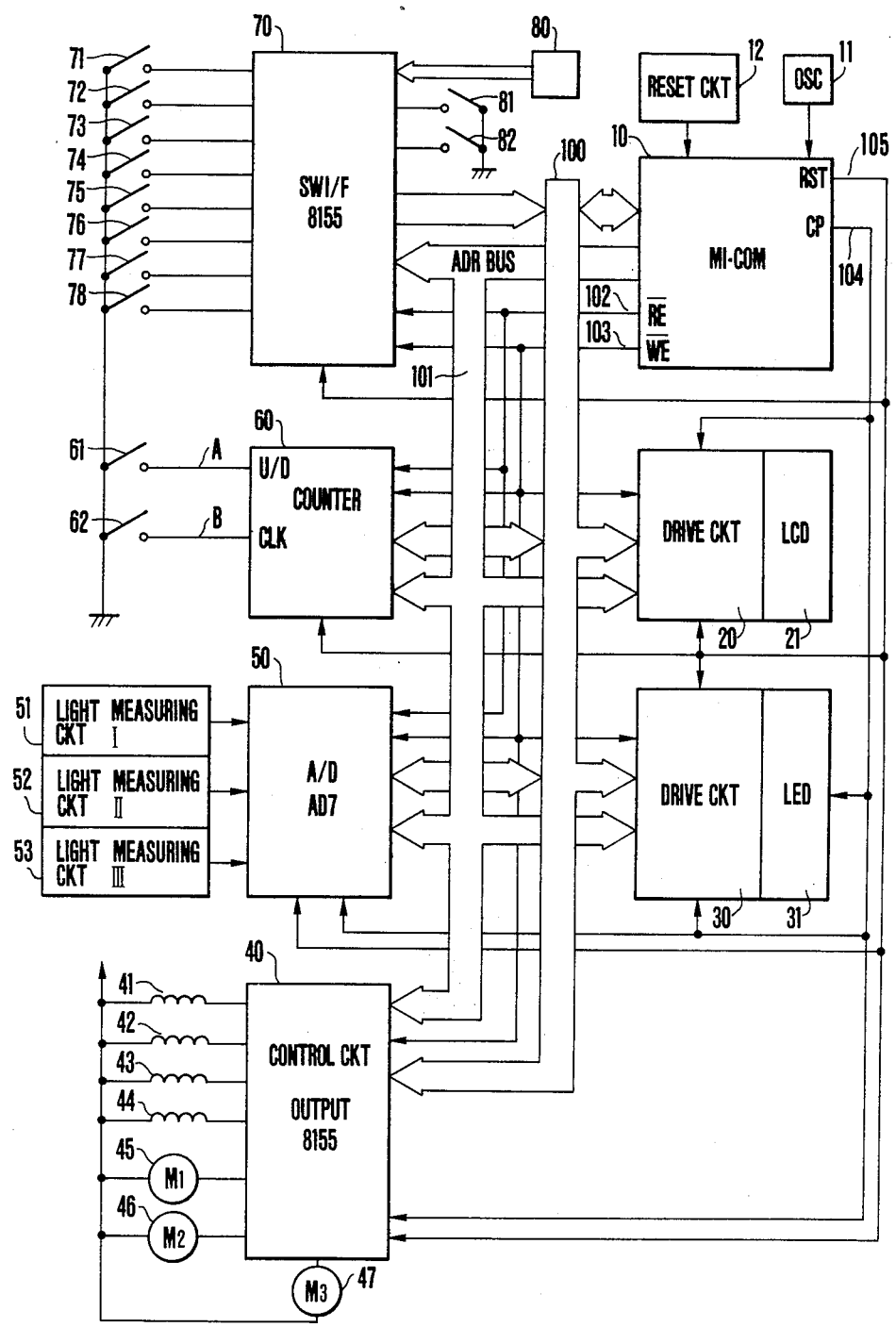
FIG. 9 is a circuit block diagram showing camera arranged as a third embodiment of this invention.

FIG. 9 shows a further embodiment of this invention in a block diagram. While the embodiment shown in FIG. 1 is provided with the multi-exposure mode setting switch 79, the embodiment shown in FIG. 9 is not provided with any switch of that kind. With the exception of that point, the rest of arrangement of this embodiment is identical with that of the embodiment shown in FIG. 1 and thus requires no further description here. The AE mode setting, light measuring mode setting and film sensitivity setting operations of this embodiment are also identical with those of the embodiment shown in FIG. 1. In setting the multi-exposure mode, however, the setting operation is arranged to be accomplished by simultaneously turning the AE mode setting switch 74 and the film sensitivity setting switch 76.

FIG. 10 shows, in a flow chart, the outline of the operation of this embodiment to be performed for setting a number of exposure performing times of each multiple exposure. The MI-COM 10 begins to operate according to the flow of processes as shown in FIG. 10 when the power supply is switched on. If both the AE mode setting switch 74 and the film sensitivity setting switch 76 are on, the operation proceeds from a step (a) to the subsequent steps (b), (c) and (d) in that order. In case that either the AE mode setting switch 74 or the film sensitivity setting switch 76 is off, the flow of operation further proceeds to another step (e) to finish a setting operation. However, the MI-COM 10 is arranged to repeat the flow of operation, the operation comes to the step (d) whenever both the switches 74 and 76 are simultaneously turned on after the power supply is switched on. The multi-exposure setting operation is arranged to be accomplished by the flow of steps subsequent to the step (d).

Then, at the steps (d) and (f), the positions of the above-stated switches 74 and 76 are once again respectively detected. The operation proceeds to a step (g) if either of these switches is found on or to another step (e) if both of them are found off. At steps (g), (h) and (i), the MI-COM 10 reads the counted value of the up-down counter 60 through the data bus 100. The content of the RAM 5, which is arranged to store the data on the number of exposure performing times of a multiple exposure, is read out. The data thus read out is added to the counted value of the up-down counter 60. The result of addition thus obtained is stored at the RAM 5. At a next step (j), the MI-COM 10 produces a signal. The signal is supplied to the drive circuit 20. This causes the LCD display device 21 to make a display corresponding to the data stored at the RAM 5. After that, the operation is again carried out according to the flow of processes from the step (d).

In short, the embodiment shown in FIG. 9 is arranged to have the multi-exposure mode selected when both the switches 74 and 76 are simultaneously turned on. Then, a data on a desired number of exposures to be performed for a multiple exposure, is set at the RAM 5 by turning the switches 61 and 62 on or off by operating a dial (not shown). The remaining portion of the multi-exposure operation is identical with the embodiment shown in FIG. 1 and is, therefore, omitted from the description given here.

The multiple exposure device which is arranged according to this invention as described in the foregoing is capable of eliminating all the shortcomings of the conventional device.

What is claimed is:

1. A multiple exposure device for a camera arranged to permit one and the same frame portion of film to be exposed to light a certain predetermined number of times comprising:
   (a) a first display circuit for displaying said predetermined number of times of the multiple exposures and for subtracting one information of times from said predetermined number of times at each of the multiple exposures so as to display the remaining number of times at the time of the multiple exposure photography; and
   (b) a second display circuit for detecting the performance of the multiple exposure so as to display that the film is exposed to light even once during the multiple exposure photography.

2. A multiple exposure device according to claim 1, wherein said second display circuit assumes a first display mode before the performance of the multiple exposure and said first display mode is switched over into a second display mode by the performance of the multiple exposure.

3. A multiple exposure device according to claim 2, wherein said second display mode is a display mode in which said first display mode is repeated intermittently.

4. A multiple exposure device for permitting one and the same frame portion of film to be exposed to light a certain predetermined number of times comprising:
   (a) a setting operation member for setting a number of times of multiple exposures:
   (b) a control circuit for permitting one and the same frame portion of film to be exposed to light a plurality of number of times according to the information of the number of times set by said setting operation member;
   (c) detecting means for detecting whether or not the multiple exposures are being performed; and
   (d) a setting information control circuit for allowing the value of the set number of the times of multiple exposures to become 0 at the time of change operation of the set number of the times by said setting operation member when it is detected by said detecting means that even one of the multiple exposures has been performed and for prohibiting the set number of times of exposure from becoming 0 by said operation member before any of the multiple exposures are performed.

5. A multiple exposure device for permitting one and the same frame portion of film to be exposed to light a certain predetermined number of times comprising:
   (a) a setting operation member for setting the number of times of multiple exposures;
   (b) a control circuit for permitting one and the same frame portion of film to be exposed to light a plurality of number of times according to the information of the number of times set by said setting operation member; and
   (c) a setting operation control circuit for prohibiting the set value of the information of the member of times from becoming 0 by the operation of said operation member before the start of the multiple exposures and allowing the set value of the information of the number of times to become 0 by the operation of said operation member during the multiple exposures of a predetermined number of times after the start of the multiple exposures.

6. A multiple exposure device according to claim 5, wherein said setting information control circuit comprises:
   a counter in which the value of the number of times is renovated and set by the operation of said operation member; and
   means for detecting the value set in said counter so as to permit response of the counter to the operation of said operation member when the set value is larger than 1 before the start of the multiple exposures and to permit the response of the counter to the operation of said operation member when the set value is larger than 0 during the multiple exposure.

7. A multiple exposure device according to claim 6, wherein said counter is preset at 1 by a supply of current thereto from a current source.

8. A multiple exposure device comprising:
   (a) a setting operation member for setting the number of film frames to be multi-exposed;
   (b) a setting circuit in which the information of said operation member of the number of film frames to be multi-exposed is set;
   (c) a first operational circuit for subtracting 1 from the information of the number of the film frames to be multi-exposed in said setting circuit, at each multiple exposure;
   (d) a second operational circuit for obtaining at the time of an initial photographing, an exposure amount for each of the number of film frames set in the setting circuit according to the content of said setting circuit and an output of a light measuring circuit before a start of the multiple exposure, and, at a time of a second and subsequent photographing, a remaining exposure amount corresponding to a difference between a sum of every exposure amount before a then photographing, and the output of the light measurement before the start of the multiple exposure, so as to obtain the exposure amount for each time according to the remaining exposure amount and the then content of the setting circuit; and
   (e) an exposure control circuit for controlling the exposure for each time according to the exposure amount obtained by said second operational circuit.

9. A multiple exposure device for a camera having a multi-exposure mode in which exposures are allowed to be effected a plurality of times on one frame portion of a film and a normal mode in which said film is moved to have one frame portion of the film is exposed only once, comprising:

(a) a control circuit arranged to carry out exposure performances a preset number of times on one and the same frame portion of the film when said multi-exposure mode is selected while said camera is in a continuously photographing mode in which the exposure operation of the camera is automatically repeated;

(b) a change-over circuit arranged to shift said multi-exposure mode to said normal mode upon completion of a multi-exposure operation performed by said control circuit; and (c) an inhibiting circuit arranged to inhibit an exposure from being automatically performed continuously following the end of said multi-exposure operation even in the event of said continuous photographing mode.

10. A multiple exposure device for a camera arranged to continuously perform a photographing operation as long as a shutter release operation member is being operated, comprising:

(a) a control circuit arranged to cause a preset plural number of exposures performed on one and the same frame portion of a film; and (b) an inhibiting circuit arranged to inhibit a phototaking operation from being performed continuously following completion of said multi-exposure operation under the control of said control circuit even while said release operation member is in a state of being operated.

* * * * *